United States Patent [19] [11] 4,417,976
Sander et al. [45] Nov. 29, 1983

[54] DEWATERING OF PETROLEUM-CONTAINING SLUDGES WITH RECOVERY OF THE OIL COMPONENT

[75] Inventors: Bruno Sander, Ludwigshafen; Friedrich Hovemann, Hockenheim; Kurt Scherling, Hemsbach, all of Fed. Rep. of Germany

[73] Assignee: BASF Aktiengesellschaft, Fed. Rep. of Germany

[21] Appl. No.: 333,416

[22] Filed: Dec. 22, 1981

[30] Foreign Application Priority Data

Jan. 14, 1981 [DE] Fed. Rep. of Germany ....... 3100899

[51] Int. Cl.$^3$ .................. C10G 17/00; C10G 17/09; C10G 33/04
[52] U.S. Cl. ................................ 208/188; 208/13; 210/708; 210/713; 210/725; 210/727; 210/728
[58] Field of Search ................ 208/188, 13; 210/708, 210/713, 725, 727, 728

[56] References Cited

U.S. PATENT DOCUMENTS

| | | | |
|---|---|---|---|
| 1,093,098 | 4/1944 | Barnickel | 210/708 |
| 1,547,712 | 7/1925 | Zoul | 208/188 |
| 1,569,695 | 1/1926 | Zoul | 208/188 |
| 1,887,774 | 11/1932 | Meinzer | 208/188 |
| 2,973,314 | 2/1961 | Hunn | 208/188 |
| 3,165,465 | 1/1965 | Ray | 210/727 |
| 3,931,005 | 1/1976 | Gasser | 210/708 |
| 4,122,009 | 10/1978 | Tao et al. | 210/708 |
| 4,299,690 | 11/1981 | Allan | 208/188 |

FOREIGN PATENT DOCUMENTS

| | | | |
|---|---|---|---|
| 54-124559 | 9/1979 | Japan | 210/708 |
| 520390 | 10/1976 | U.S.S.R. | 208/188 |

OTHER PUBLICATIONS

Proceedings of the Filtration Society, "Flocculants" by C. M. Thomas, *Ph.D., B.SC. 6-16-65.

Primary Examiner—Delbert E. Gantz
Assistant Examiner—Helane E. Maull
Attorney, Agent, or Firm—Keil & Witherspoon

[57] ABSTRACT

A process for dewatering petroleum-containing sludges by a two-stage method using finely divided additives and organic flocculants, wherein (a) finely divided additives, such as ash, coal, sand or mixtures of these, in a free-flowing form or as an aqueous suspension, are homogeneously dispersed in the petroleum-containing sludge, in an amount such that the total solids content of the resulting mixture is from 10 to 30% by weight, especially from 12 to 20% by weight, (b) this sludge mixture is treated with an aqueous solution of an organic flocculant, preferably of anionic nature, (c) the greater part of the sludge water is removed by gravity filtration, (d) the pre-dewatered sludge mixture is treated with an aqueous solution of aluminum salts or trivalent iron salts and (e) this mixture is substantially dewatered by pressure filtration, in the course of which the greater part of the petroleum present is also removed.

4 Claims, No Drawings

DEWATERING OF PETROLEUM-CONTAINING SLUDGES WITH RECOVERY OF THE OIL COMPONENT

The present invention relates to a process for dewatering petroleum-containing sludges by a two-stage method using finely divided additives and organic flocculants.

For the purposes of the invention, petroleum-containing sludges, hereafter referred to as oil sludges, are three-phase mixtures of water, petroleum and sludge solids. Such oil sludges arise in petroleum production, as "tanker sludge" in transporting crude oil, as tank residues when storing crude oil, in the processing of crude oil, in the petrochemical industry, in the petroleum industry and in the course of using petroleum products, for example in the form of spent or waste oil contaminated with solids.

Oil sludges are disposed of either in sludge pits or on special tips, depending on the consistency of the sludge. In the latter case, it is necessary additionally to consolidate the sludge with alkaline reagents, generally by adding burnt lime. The various types of disposal ultimately only constitute intermediate storage, since there is a substantial hazard to the environment. Thus, petroleum can, through seepage, pass into ground water and surface water and thereby interfere with sources of both industrial water and drinking water. Moreover, there may be an odor nuisance.

Another type of disposal is incineration in waste incinerators. However, since the water content is in most cases high, valuable primary energy is lost. On the other hand, if the oil content is relatively low, additional fuel must be employed.

Processes which would permit recovery of the oil content entail multi-stage, complicated methods, for example distillation and extraction. These separation processes are cost-intensive and energy-intensive and are therefore, at present, uneconomical.

Selective removal of the sludge solids from the three-phase mixture by flocculation with organic flocculants and sedimentation does not succeed, especially at relatively high oil contents, since the flocculated material becomes slimy.

It is an object of the present invention to modify and/or treat the oil sludges, by suitable measures, so that the sludge water can be substantially removed by conventional dewatering methods and the oil content can be separated off as pure material, and be recovered. It is a further object of the invention to concentrate the sludge solids sufficiently to ensure that they have a very low oil content and are spadable, the concentrate being intended either for dumping or for incineration.

We have found that these objects are achieved, according to the invention, by a process wherein
 (a) finely divided additives, such as ash, coal, sand or mixtures of these, in a free-flowing form or as an aqueous suspension, are homogeneously dispersed in the petroleum-containing sludge, in an amount such that the total solids content of the resulting mixture is from 10 to 30% by weight, especially from 12 to 20% by weight,
 (b) this sludge mixture is treated with an aqueous solution of an organic flocculant, preferably of anionic nature,
 (c) the greater part of the sludge water is removed by gravity filtration,
 (d) the pre-dewatered sludge mixture is treated with an aqueous solution of aluminum salts or trivalent iron salts and
 (e) this mixture is substantially dewatered by pressure filtration, in the course of which the greater part of the petroleum present is also removed.

In a further development of the invention, a part of the filter cake obtained from the pressure filtration is mechanically loosened, brought into a finely divided form and then dispersed homogeneously as a finely divided additive, in place of ash, coal or sand, in the petroleum-containing sludge.

The oil sludge to be treated according to the invention in general contains from 10 to 75% by weight of petroleum. The sludge solids content is from 2 to 10% by weight.

According to the invention, the solids content is increased to a concentration of 10–30% by weight by introducing finely divided additives.

Ashes of very diverse origin may be employed for this purpose. The use of ashes resulting from garbage incineration or sewage sludge incineration is particularly economical. The ash should have a pH of from 6 to at most 8. An ash of pH greater than 8 has an adverse effect on the subsequent flocculation reaction. The ash should be substantially free from water-soluble constituents.

Other suitable finely divided additives include finely divided coal, obtained, for example, by separating coal fines from gangue by flotation and subsequent dewatering. Coal sludges resulting from wet processing are also suitable, as are sieve fractions of power station coal or of green coke from refineries, these materials having a particle size of up to 1 mm. In special cases, fine sand can also be used as a finely divided additive.

The mixing of the oil sludges with the finely divided additives is carried out either continuously in commercial dynamic or static tube mixers or batchwise in stirred vessels. Thereafter, an aqueous solution of organic flocculants is added to the sludge mixture.

Commercial organic flocculants can be employed. These include water-soluble, macromolecular compounds which have been obtained by polymerizing or copolymerizing, for example, acrylamide, acrylic acid and/or its salts or esters of acrylic acid or methacrylic acid specially modified by choice of the alcohol component, which may be, for example, an aminoalcohol. The flocculants moreover differ in respect of their electrical charge (ie. they may be cationic, anionic or electrically neutral) and in respect of their degree of polymerization.

The appropriate type and amount of flocculant are decided by conventional laboratory scale methods, as described in German Laid-Open Application DOS 2,837,017. In the process according to the invention, anionic flocculants have proved particularly suitable. The amount of flocculant required is from 50 to 350 g/m$^3$ of sludge and depends on the nature of the particular sludge and on the solids concentration.

The flocculants are employed in the form of aqueous solutions of from 0.05 to 0.2% strength. These dilute solutions are prepared from the solid or liquid commercial products by conventional methods, in commercial equipment.

The flocculant solution is directly fed into the sludge line downstream of the sludge pump. An aid for introducing the solution, for example a cone mixer or static tube mixer of small cross-section, can prove advantageous.

After this pre-mixing, the sludge is pre-treated with the aqueous flocculant solution of 0.05–0.2% strength. The pre-treatment can be carried out in a stirred vessel with vertical upward flow (a dynamic flocculating reactor) in the course of from 1 to 3 minutes, at stirrer speeds of from 5 to 50 rpm. The floc maturing time and the most advantageous energy input can be determined by the method described in German Laid-Open Application DOS 2,920,434.

The pre-treatment can be carried out equally successfully in static tube mixers possessing internal spirals. In that case, the floc maturing time is less than 1 minute, because of the special hydraulic conditions. As a rule, a plurality of mixing elements is arranged in series, and this mixing zone (static flocculation reactor) then forms a part of the sludge line.

This pre-treatment brings the sludge mixture to optimum condition for dewatering. A critical factor in the process according to the invention is the choice of a flocculant which, after the flocculation reaction in the stirred vessel or static tube mixer, permits a particularly high degree of gravity dewatering of the sludge mixture, since the intention is that the greater part of the sludge water should be removable by pure gravity filtration.

After the sludge pre-treatment described, the flocculated sludge mixture containing the additives is fed to a dewatering unit and subjected to gravity filtration. Suitable dewatering units for this purpose are belt filters or screening drums. The belt filter may also constitute the lower belt of a perforated belt press.

The screening drum consists of a cylindrical cage, with a filter cloth stretched over the peripheral surface of the cage. The filter cloth may consist of metal wire or of synthetic fibers, e.g. polypropylene fibers or polyester fibers. The screening drum may additionally have internal fitments which continuously create a new sludge surface, so that the sludge is turned thoroughly as it passes through the drum. Such internal fitments may be baffle plates, weirs or hollow spirals. The residence time in the screening drum of the petroleum-containing sludge to be dewatered is determined by the length of the apparatus, the throughput and the degree to which the apparatus is filled. The drum runs at speeds of from 1 to 20 rpm. The residence time in this dewatering stage is from 1 to 10 minutes, especially from 2 to 5 minutes.

After gravity filtration on the said types of apparatus, sludge solids contents of from 20 to 30% by weight are achieved, and as much as from 40 to 80% of the water is removed.

The pre-dewatered sludge mixture is treated with an aqueous solution of aluminum salts, eg. $AlCl_3$, or of trivalent iron salts, eg. $FeCl_3$, $FeClSO_4$ or $Fe_2(SO_4)_3$. The metal salt concentrations of the aqueous solutions can be from 1 to 20% by weight, and the amounts required are from 1 to 3 kg of metal salt (taken as 100% pure) per $m^3$ of oil sludge.

The treatment with the aqueous metal salt solution is carried out in a horizontal mixer or, particularly advantageously, by spraying the solution from distributor nozzles onto the pre-dewatered sludge mixture.

After addition of the metal salt solution, the sludge mixture is subjected to pressure filtration. Suitable filter presses are, for example, chamber filter presses, plate-and-frame filter presses and membrane filter presses. However, the continuously operating pressure zones of perforated belt presses are particularly suitable for this purpose.

Since the gravity filtration can be carried out in the first process stage of a perforated belt press, namely the strainer zone, while the second stage of such a press, namely the stage comprising the wedge and pressure zones, is suitable for pressure filtration, perforated belt presses are particularly suitable for use in the process according to the invention. We have found that if the measures provided by the invention are employed, perfectly satisfactory operation of such a press is possible.

The addition of the metal salt causes spontaneous separation of the petroleum from the sludge solids. Since the petroleum rapidly flows away through the filter belt, the sludge solids neither strike through the belt nor exude at the sides, in the press zone. The sludge is pressure-resistant.

In the pressure zones, from 80 to 99% of the petroleum present can be expressed. The filtrates from the pressure zones are separately collected in a separating vessel, where the oil phase automatically and cleanly separates from the residual sludge water.

Because of the high degree of deoiling of the sludge solids, the filter cake automatically detaches from the filter belt, and the latter does not require any special cleaning.

In carrying out the process according to the invention it is necessary to ensure that the petroleum is flowable, ie. it is necessary to work significantly above the pour point (determined according to DIN 51,597) of the petroleum. The process can in general be carried out at above $+15°$ C.

The filter cake obtained has a solids content (comprising sludge solids and finely divided additive) of from 55 to 75%, is spadable and has a low residual oil content, in general from 0.5 to 15.0%.

In a particular embodiment of the process according to the invention, a part of the filter cake can, after mechanical loosening, be employed—either direct or, after redispersion in water, in the form of an aqueous suspension—as a finely divided additive.

The additives according to the invention, such as ash, finely divided coal or sand, are then only added in smaller amounts or when the process begins to run less well.

The economic advantage of the process according to the invention is that from 80 to 99% of the petroleum contained in the oil sludge can be recovered and is no longer lost as waste. The environmental problems which arise with the commonest type of disposal, namely dumping in sludge pits, are avoided by the process according to the invention.

As a result of the high degree of concentration of the sludge solid and the low residual water content of from 10 to 30%, the press cake obtained is transportable and storable.

In the embodiment of the process in which ash (Example 9) or sand is used as the additive, the press cakes can be disposed of on garbage dumps or special dumps, without requiring an excessive amount of space. Because of the low calorific value (see Example 9: 1,843 kJ/kg or 441 kcal/kg), incineration of these press cakes is uneconomical.

If it is intended to dispose of the press cake by incineration, the embodiment of the process in which finely divided coal is employed as the additive is recommended. In that case, the calorific value $H_U$ of the press cake is particularly high (cf. Example 11: 14,768 kJ/kg or 3,533 kcal/kg), ie. of the same order as that for a good quality lignite ($H_U$: 2,500–3,500 kcal/kg), and accordingly the press cake can be used as a power station fuel. This has the advantage that the finely divided coal initially employed as a dewatering aid is used further, as a primary energy source. Moreover, the residual oil and the organic content of the sludge solids can thus be converted, at conventional efficiencies, to secondary energy (electricity and steam). Accordingly, the press cake is a useful primary energy source which can be combusted, in place of other primary energy sources, in power stations.

The Examples which follow, in which percentages are by weight, illustrate the invention.

In Examples 1 to 6 and Comparative Examples 1 to 4, the oil sludge used came from the preparation unit of an oilwell operation and had the following composition:
Solids content: 3.9%
Oil: 32.5%
Water: 63.6%
Density: 0.98 g/cm³

EXAMPLES 1 TO 4

448 g of oil sludge were mixed homogeneously with 45 g of each of the finely divided additives shown (taken as 100% solids). To each of these mixtures, in a 1 liter measuring cylinder, were added 75 ml (150 mg of active ingredient/liter of mixture) of a 0.1% strength aqueous solution of a 40% anionically modified flocculant, namely a copolymer of 60% of acrylic acid and 40% of sodium acrylate. The mixture was flocculated by inverting the measuring cylinder 5 times. The sludge samples thus pre-treated were poured into a Büchner suction funnel, made from borosilicate glass and having a plane-ground slotted sieve of 120 mm $\phi$, carrying a polypropylene linen-weave filter fabric disc of 110 mm $\phi$. The filtrate (water) was collected in a measuring cylinder. After 30 minutes' gravity filtration, the amount of filtrate was measured.

The pre-dewatered sludge samples were homogeneously mixed with 4.5 ml of a 20% strength aqueous $FeCl_3$ solution of density 1.19 g/cm³ (corresponding to 1.07 g of $FeCl_3$) in a porcelain dish. Thereafter, the sludge samples were subjected to pressure filtration in a laboratory ram press (from Hubert, Sneek/Netherlands), by subjecting them to increasing pressure for 1 minute and then keeping them under a constant pressure of 10 bar for 2 minutes. This removed the greater part of the oil, plus some additional water. In each case, it was possible to separate the expressed oil cleanly from the water in a separating vessel. During pressing, no sideways exudation of the sludge occurred. The press cake was dry and detached satisfactorily from the filter fabric.

The dewatering results are shown in Table 1.

TABLE 1

| Example | Finely divided additive | Solids content (in %) after gravity filtration | Composition of the press cake | | | Amount separated from the oil sludge employed | |
|---|---|---|---|---|---|---|---|
| | | | Solids content (%) | Oil (%) | $H_2O$ (%) | Oil (%) | $H_2O$ (%) |
| 1 | Coal fines (flotation concentrate) (solids content: 86.7%) | 22.1 | 63.9 | 18.3 | 18.1 | 88.7 | 94.3 |
| 2 | Coal sludge (solids content: 41.5%) | 22.1 | 61.4 | 18.9 | 19.7 | 87.9 | 93.5 |
| 3 | Sewage sludge ash, pH: 7.6, particle size: 85% less than 200 μm, 98% less than 300 μm | 21.9 | 59.8 | 15.8 | 24.4 | 88.4 | 90.9 |
| 4 | Sand (particle size: 98.0% less than 315 μm) | 22.5 | 58.9 | 22.9 | 18.2 | 86.2 | 94.4 |

EXAMPLES 5 AND 6

The procedure followed was as described in Examples 1 to 4, using sewage sludge ash (pH: 7.6) as the finely divided additive. After gravity filtration, the following were employed in place of an $FeCl_3$ solution: in Example 5, 4.5 ml of a 20% strength $AlCl_3$ solution (equivalent to 1.07 g of $AlCl_3$), and in Example 6, 4.5 ml of a 20% strength aqueous $FeClSO_4$ solution (equivalent to 1.07 g of $FeClSO_4$).

The following results were obtained:

| | Example 5 | Example 6 |
|---|---|---|
| Solids content (%) (after gravity filtration) | 21.8 | 21.9 |
| Composition of the press cake: | | |
| Solids content (%) | 61.2 | 59.1 |
| Oil (%) | 14.8 | 15.6 |
| $H_2O$ (%) | 24.0 | 25.3 |
| Amounts separated from the oil sludge: | | |
| Oil (%) | 90.9 | 90.3 |
| $H_2O$ (%) | 92.4 | 92.0 |

The press cake was easily removable from the filter fabric, and the oil phase separated cleanly from the water phase.

COMPARATIVE EXAMPLE 1

75 ml of a 0.1% strength aqueous solution of a 40% anionically modified flocculant were added to 448 g of oil sludge in a 1 liter measuring cylinder. The sludge was partially flocculated by inverting the measuring cylinder 5 times. The flocculated oil sludge was pre-dewatered as described above. It only proved possible to separate off a small amount of sludge water, which contained oil. Pressure filtration on a ram press proved impossible, since the sludge was not pressure-resistant and accordingly exuded from the side of the press.

COMPARATIVE EXAMPLE 2

4.5 ml of a 20% strength aqueous $FeCl_3$ solution were mixed homogeneously into 44 g of oil sludge. The sludge pre-treated in this way was then treated in a 1 liter measuring cylinder with 75 ml of a 0.1% strength aqueous solution of a 40% anionically modified flocculant, as in Comparative Example 1. It was not possible to produce flocculation and accordingly dewatering was not possible either.

COMPARATIVE EXAMPLE 3

75 ml of an 0.1% strength aqueous solution of a 40% anionically modified flocculant were added to 448 g of oil sludge in a 1 liter measuring cylinder. The sludge was partially flocculated by inverting the measuring cylinder 5 times. After flocculation, the sludge sample was mixed homogeneously with 4.5 ml of a 20% strength aqueous $FeCl_3$ solution; the addition of this solution severely damaged the floc. Dewatering by gravity filtration was feasible with certain limitations. Separating off the oil and water by pressure filtration on a ram press did not prove possible.

COMPARATIVE EXAMPLE 4

The procedure followed was as described in Comparative Example 1. After partial flocculation, and pre-dewatering, the sludge sample was mixed homogeneously with 4.5 ml of a 20% strength aqueous $FeCl_3$ solution in a porcelain dish. This was followed by pressure filtration in a ram press, in which it proved possible partially to separate off the oil and additional water. The oil sludge was more pressure-resistant, and only small amounts of sludge exuded from the side of the ram press. However, the press cake was difficult to detach from the filter fabric.

Comparative Examples 1 to 4, in conjunction with Example 3, show that the object of the invention can only be achieved by the measures provided according to the invention.

EXAMPLE 7

The oil sludge used came from the preparation unit of an oilwell operation and had the following composition:
Solids content: 8.6%
Oil: 27.0%
Water: 64.4%
Density: 0.985 g/cm$^3$ 450 g of oil sludge were mixed with 19 g of an ash from a garbage incinerator (pH of the sludge/ash mixture, 7.2). To this sludge mixture, in a 1 liter measuring cylinder, were added 75 ml (150 mg of active ingredient/liter of mixture) of a 0.1% strength aqueous solution of a 20% anionically modified flocculant, namely a copolymer of 80% of acrylic acid and 20% of sodium acrylate. The mixture was flocculated by inverting the measuring cylinder 5 times. Gravity filtration was then effected as described for Examples 1 to 4.

The pre-dewatered sludge mixture was mixed homogeneously with 4.5 ml of a 20% strength aqueous $FeCl_3$ solution (equivalent to 1.07 g of $FeCl_3$) in a porcelain dish. Thereafter, pressure filtration was effected as described above.

A dry press cake, which detached satisfactorily from the filter cloth, was obtained. The expressed oil separated cleanly from the water.

After gravity filtration, the solids content was 22.4%. The press cake had the following composition: solids content: 56.9%, oil: 16.1%, water: 27.0%. Accordingly, 89% of the oil and 92.3% of the sludge water were separated off.

EXAMPLES 8 TO 11

In the preparation unit of an oilwell operation, an oil sludge from the flooding unit and an oil sludge from the tank farm were mixed in a volume ratio of 1:1. The composition of this oil sludge mixture was: solids content: 6.8%, oil: 30.8%, water: 62.4%.

3 m$^3$ portions of this oil sludge mixture were mixed with 330 kg of one of the finely divided additives shown in Table 2, by stirring, in a mixer, with a slow-speed cross-arm paddle stirrer. The solids content of the mixture was 16%. Downstream of the sludge pump, a 0.1% strength aqueous solution of a 40% anionically modified organic flocculant, namely a copolymer of 60% of acrylic acid and 40% of sodium acrylate, was introduced, in an amount of 140 g of active ingredient/m$^3$ of sludge, into the sludge line. Mixing of the sludge mixture with the flocculant solution was effected in a series of static mixers.

The pre-treated sludge mixture was then dewatered on a commercial perforated belt press, having a 100 mm wide belt. In the straining zone, it proved possible to separate off the greater part of the water present. The filtrate was clear and contained no more than traces of oil and sludge solids.

Downstream of the straining zone, a 4% strength aqueous $FeCl_3$ solution, in the amounts shown in Table 2, was sprayed by means of distributor nozzles onto the pre-dewatered sludge mixture. This was followed by pressure filtration in the wedge zone and the pressure zones of the machine. The sludge was pressure-resistant in each case and neither struck through the filter cloth nor exuded sideways. The filtrate from the pressure zones was collected in a separating vessel, where the oil phase automatically and cleanly separated from the small amount of water phase.

The press cake detached satisfactorily from the filter cloth and was spadable. No flushing of the belt was necessary. It was possible to run the machine at a throughput of 3 m$^3$ of oil sludge/h.

Further data and results are shown in Table 2.

The calorific values $H_U$ of the press cakes of Examples 9 and 11, of the petroleum (oil phase) and of the coal fines used were determined:

|  | kJ/kg | kcal/kg |
| --- | --- | --- |
| Petroleum (oil phase) | 45,144 | 10,800 |
| Flotation concentrate | 29,093 | 6,960 |
| Press cake (Example 9) | 1,843 | 441 |
| Press cake (Example 11) | 14,768 | 3,533 |

TABLE 2

| Example | Finely divided additive | Amount of $FeCl_3$ added, kg/m$^3$ of oil sludge | Composition of the press cake | | | Amount of oil separated off |
| --- | --- | --- | --- | --- | --- | --- |
|  |  |  | Solids content % | Oil % | H$_2$O % |  |
| 8 | Garbage incinerator ash, pH 7.2 | 1.7 | 62.6 | 9.1 | 28.3 | 96.1 |

TABLE 2-continued

| Example | Finely divided additive | Amount of FeCl₃ added, kg/m³ of oil sludge | Composition of the press cake | | | Amount of oil separated off |
| --- | --- | --- | --- | --- | --- | --- |
| | | | Solids content % | Oil % | H₂O % | |
| 9 | Garbage incinerator ash, pH 7.2 | 2.6 | 68.4 | 5.5 | 26.1 | 97.6 |
| 10 | Coal fines (flotation concentrate) (solids content 86.7%) | 1.3 | 59.6 | 12.1 | 28.3 | 94.8 |
| 11 | Coal fines (flotation concentrate) (solids content 86.7%) | 2.1 | 64.2 | 8.6 | 27.2 | 96.3 |

EXAMPLE 12

The procedure followed was as described for Examples 8 to 11, except that, per m³ of oil sludge mixture, 110 kg of the press cake from Example 9 were mechanically loosened and then dispersed homogeneously in the mixture. 2.6 kg of FeCl₃/m³ of oil sludge were added.

Dewatering, and separating off the oil on a perforated belt press, proceeded satisfactorily.

Composition of the press cake: solids content: 67.9%, oil: 6.0%, H₂O; 26.1%.

Proportion of oil separated from the oil sludge: 97.4%.

COMPARATIVE EXAMPLES 5 TO 7

The procedure followed was as described for Examples 8 to 11, except that, per m³ of the oil sludge mixture, 110 kg of additives not according to the invention were dispersed homogeneously in the mixture, and the addition, according to the invention, of an aqueous metal salt solution after gravity filtration was omitted.

The following additives were used:
Comparative Example 5: Sawdust
Comparative Example 6: Milled limestone
Comparative Example 7: Milled dolomite

Results

In every case, a cloudy filtrate was obtained in the straining zone of the perforated belt press. In the pressure zones, the sludge mixture was forced through the filter fabric, and sludge exuded from the sides. The press cake was difficult to detach from the filter belt. The perforated belts and the entire machine became heavily contaminated with oil sludge. The material discharged from the press was pasty and unsuitable both for transportation and for dumping.

EXAMPLE 13

An oil sludge from a collecting basin from a petroleum refinery was used, and was homogenized by circulatory pumping. It had the following composition:
Solids content: 6.1%
Oil: 71.2%
Water: 22.7%
Density: 0.962 g/cm³
pH: 6.7

500 g of oil sludge were mixed homogeneously with 60 g of sewage sludge (at pH 7.6). To this mixture, in a 1 liter measuring cylinder, were added 150 ml (300 mg of active ingredient/liter of mixture) of a 0.1% strength aqueous solution of a 20% anionically modified flocculant, namely a copolymer of 80% of acrylic acid and 20% of sodium acrylate. Flocculation was effected by inverting the measuring cylinder 10 times. The gravity filtration, treatment with an aqueous FeCl₃ solution and pressure filtration on a laboratory press were carried out as described for Examples 1 to 4.

Solids content:
after addition of ash: 16.0%
after gravity filtration: 23.8%

The press cake detached from the filter cloth without any sticking. The expressed oil and water separated cleanly in the separating vessel.

Composition of the press cake:
Solids content: 72.6%
Oil: 0.9%
H₂O: 26.5%

Amounts separated from the oil sludge:
Oil: 98.7%
H₂O: 88.5%

COMPARATIVE EXAMPLE 8

The procedure followed was as described in Example 13, except that the aqueous FeCl₃ solution was not added.

The press cake was difficult to detach from the filter cloth, and the oil phase and water phase of the filtrate were contaminated with solids.

Composition of the press cake:
Solids content: 70.9%
Oil: 2.5%
H₂O: 26.6%

Amounts separated from the oil sludge:
Oil: 96.6%
H₂O: 88.4%

EXAMPLE 14

The procedure followed was as described in Example 13, except that 80 g of a green coke obtained from a refinery were used as the finely divided additive. The calorific value $H_U$ of the green coke was 35,100 kJ/kg (8,400 kcal/kg). The particle size of the coke was less than 1 mm.

150 ml (300 mg of active ingredient/liter of mixture) of a 0.1% strength aqueous solution of an electrically neutral flocculant (polyacrylamide) were used for flocculation.

Solids contents:
after addition of green coke: 19.0%
after gravity filtration: 28.5%

The press cake detached easily from the filter cloth. The oil and water separated cleanly in the separating vessel, and both phases were free from solids.

Composition of the press cake:
Solids content: 73.1%
oil: 8.1%
$H_2O$: 14.8%.

Amounts separated from the oil sludge:
Oil: 89.3%
Water: 93.8%

The following calorific values $H_U$ were found:

|  | kJ/kg | kcal/kg |
|---|---|---|
| Oil phase | 48,870 | 11,691 |
| Press cake | 22,062 | 5,278 |

We claim:

1. A process for dewatering petroleum-containing sludges by a two-stage method using finely divided additives and organic flocculants which comprises:
   (a) homogeneously dispersing in the petroleum-containing sludge finely divided additives selected from the group consisting of ash, coal, sand or mixtures of these, in a free-flowing form or as an aqueous suspension, in an amount such that the total solids content of the resulting mixtures is from 10 to 30% by weight,
   (b) treating the sludge mixture with an aqueous solution of an organic flocculant,
   (c) removing the greater part of the sludge water by gravity filtration,
   (d) treating the pre-dewatered sludge with an aqueous solution of aluminum salts or trivalent iron salts and
   (e) pressure filtering the resulting mixture from step (d) to separate the petroleum and water from the solids.

2. The process of claim 1, wherein a part of the filter cake obtained from the pressure filtration is mechanically loosened, brought into a finely divided form and then dispersed homogeneously as an additive, in place of ash, coal or sand, in the petroleum-containing sludge.

3. The process of claim 1, wherein the solids content of the resulting mixtures formed in step (a) is from 12% to 20% by weight.

4. The process of claim 3, wherein the organic flocculant is of anionic nature.

* * * * *